E. E. ADAMS & J. L. DUDEK.
PIG FORCEPS.
APPLICATION FILED AUG. 2, 1911.
1,023,705.
Patented Apr. 16, 1912.
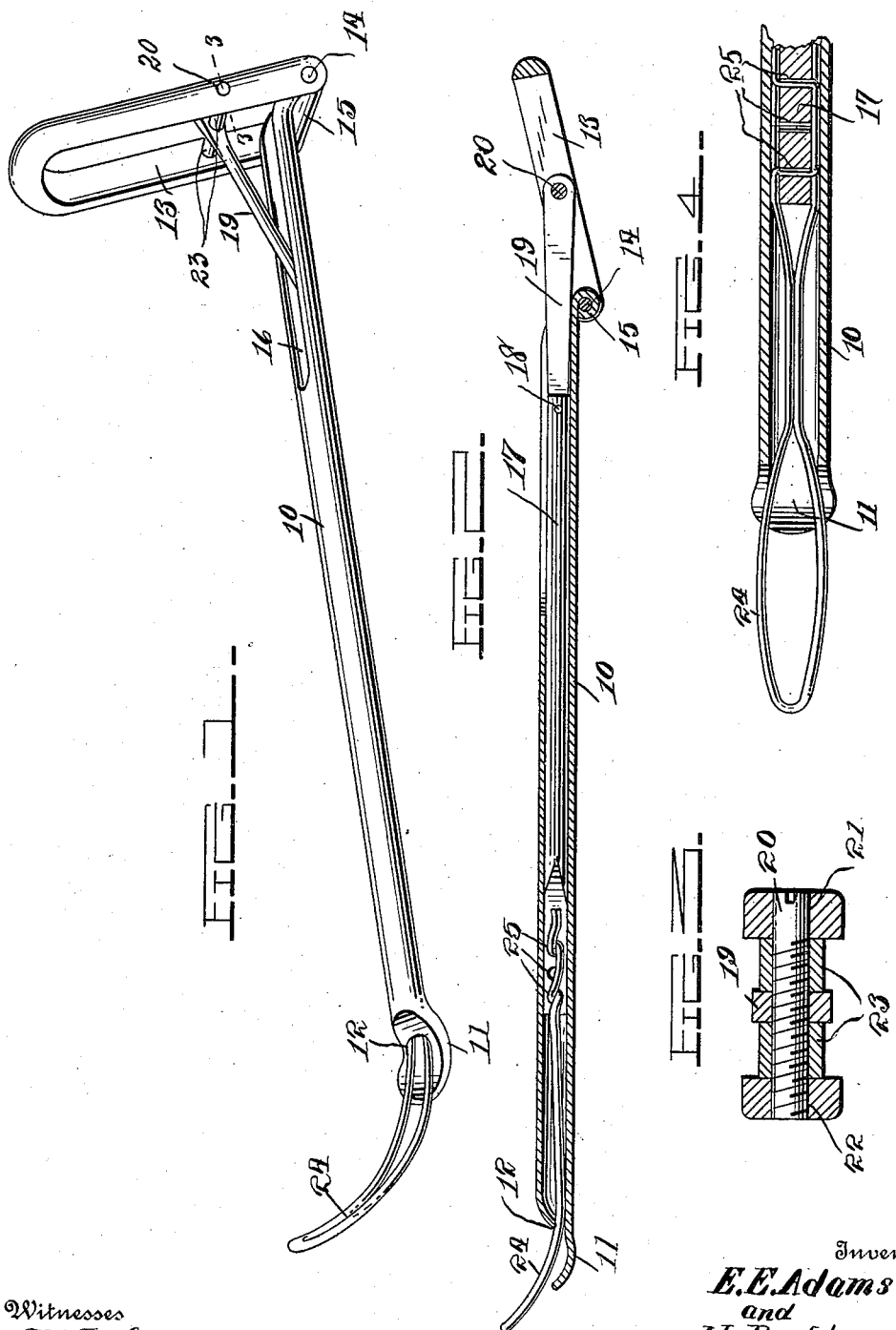
Witnesses
J. W. Taylor
J. E. Burch.
Inventors
E. E. Adams
and
J. L. Dudek.
By
Attorneys
COLUMBIA PLANOGRAPH CO., WASHINGTON, D. C.

UNITED STATES PATENT OFFICE.

EARNEST E. ADAMS AND JOHN L. DUDEK, OF SCHUYLER, NEBRASKA.

PIG-FORCEPS.

1,023,705.          Specification of Letters Patent.          Patented Apr. 16, 1912.

Application filed August 2, 1911. Serial No. 641,988.

*To all whom it may concern:*

Be it known that we, EARNEST E. ADAMS and JOHN L. DUDEK, citizens of the United States, residing at Schuyler, in the county of Colfax, State of Nebraska, have invented certain new and useful Improvements in Pig-Forceps; and we do hereby declare the following to be a full, clear, and exact description of the invention, such as will enable others skilled in the art to which it appertains to make and use the same.

This invention relates to veterinary surgical instruments and more especially to pig forceps and the object of the invention is to provide an improved and simple form of device of this character which may be used with complete success and without injury to the sow and little or no injury to the pig.

With the above and other objects in view the invention consists of certain other combinations and arrangements of parts as will be hereinafter more fully described and claimed, it being a still further object of the invention to provide a device which will not be likely to get out of working order.

In the drawings:—Figure 1 is a perspective view of our improved forceps, the device being in a position for use after being introduced. Fig. 2 is a longitudinal sectional view of the forceps in a position to be introduced. Fig. 3 is a detailed sectional view taken on the line 3—3 of Fig. 1. Fig. 4 is a detailed fragmentary elevation showing the manner of attaching the operating loop to the rod.

Referring to the drawings in detail, there is shown a tubular member 10 which is formed at its entrance end with a spoon shaped or curved portion 11 which is slightly dipped from the tube proper and is turned upwardly to a point in line with the axial center thereof while the adjacent opening in the tubular member is somewhat flattened and elongated as shown at 12. A yoke lever 13 of U-form in general outline has the extremities of its leg portions pivotally secured as shown at 14 to a down-turned ear 15 formed at the opposite extremity of the tube, and said tube is formed with a longitudinal slot 16 extending for a portion of its length from said end and communicating with the bore of the tube.

A rod 17 is fitted in the bore of the tube and is of a length approximately equal to the length of the lower portion of the tube from the end wall or slot 16 and said rod is pivotally connected as shown at 18 to a link 19 which at its opposite extremity is flattened and pivotally connected to the yoke lever between its leg portions and intermediate its ends by a screw bolt 20. This screw bolt engages loosely through an aperture 21 in one leg portion and is threaded into an aperture 22 in the opposite leg portion and is engaged through an aperture in the flattened end portion of the link 19 while ferrules 23 are mounted on the bolt between the inner faces of the leg portions and the link to hold said link centrally spaced relative thereto. A gripping loop 24 formed of resilient wire bent upon itself has its extremities secured to the opposite extremity of the rod 17 and this connection is obtained by disposing the said extremities through openings 25 in the rod in alternate directions and from opposite sides thereof, thus insuring that the loop is positively held in position and avoiding any sharp projections.

By reason of the pivotal connection of the rod with the lever, when the device is in the position shown in Fig. 2 of the drawings with the lever extended in a line with the tubular member, the rod and loop carried thereby are drawn upwardly through the tubular member, thus restricting the loop in size for convenient application and by reason of the resiliency of the loop and the fact that it is normally curved in a common direction as the spoon-shaped or curved extremity of the tubular member when the lever is moved to an upright position as shown in Fig. 1 and the link slides in the slot 16, the rod will be forced outwardly and the loop will be allowed to expand and form an approximate hook-shaped member. When the device is introduced for use, the hook shaped member may be properly manipulated and the extracting operation may be accomplished in a desirable manner.

We claim:—

An instrument of the class described comprising a tubular member having a flattened and upwardly curved portion at one extremity, the bore of the tube adjacent thereto being elongated, a rod fitted in the tube, a curved expansible gripping loop secured at its extremities to apertures in the adjacent extremity of the rod, a yoke lever pivotally secured to the opposite extremity of the tube and a link pivotally connected to the lever intermediate its ends and between its leg portions at one end and at its opposite end to the rod, said link being slidable in a slot formed in the tube.

In testimony whereof, we affix our signatures in presence of two witnesses.

EARNEST E. ADAMS.
JOHN L. DUDEK.

Witnesses:
B. F. FARRELL,
M. SMITH.

---

Copies of this patent may be obtained for five cents each, by addressing the "Commissioner of Patents, Washington, D. C."